United States Patent [19]

Bourgeois

[11] 3,828,367

[45] Aug. 13, 1974

[54] METHOD OF AND INSTALLATION FOR CONTINUOUS MANUFACTURE OF UNSEWN ARTICLES OF CLOTHING

[75] Inventor: Alain Bourgeois, Le Puy-Haute-Laire, France

[73] Assignee: Elastelle Paul Fontanille & Fils, Haute-Loire, France

[22] Filed: Sept. 16, 1971

[21] Appl. No.: 181,062

[30] Foreign Application Priority Data

Sept. 18, 1970   France .............................. 70.33899

[52] U.S. Cl................ 2/224 A, 2/243 R, 156/164, 156/217
[51] Int. Cl. ............................................ A41b 9/04
[58] Field of Search.... 2/224 A, 224 R, 227, 243 R, 2/243 B; 112/121–126; 156/160, 164, 217, 252, 438, 494, 513

[56] References Cited
UNITED STATES PATENTS

| | | | |
|---|---|---|---|
| 3,156,927 | 11/1964 | Grimm et al. ........................ | 2/243 R |
| 3,488,778 | 1/1970 | Goujon et al. ....................... | 2/224 A |
| 3,560,292 | 2/1971 | Butler .............................. | 2/224 A X |
| 3,616,770 | 11/1971 | Blyther et al. ................. | 112/121.26 |
| 3,663,962 | 5/1972 | Burger .............................. | 2/224 A |

Primary Examiner—H. Hampton Hunter
Attorney, Agent, or Firm—Graybeal, Barnard, Uhlir & Hughes

[57] ABSTRACT

A method apparatus for installation for the continuous manufacture of articles of clothing constituted by a flexible non-elastic element on which is fixed locally at least one stretched elastic element adapted to confer on the said non-elastic element the faculty of stretching, the elastic element being fixed in position in the stretched condition. The said method comprising essentially the steps of: causing a continuous strip of said non-elastic element to travel, without being subjected to deformation, at a constant speed and always in the same direction; simultaneously causing at least one continuous tape or band of said elastic element to move in the same direction and at the same speed as the said strip, while subjecting said elastic tape to a pre-determined stretch; fixing the said elastic tape in the stretched condition on the said non-elastic strip; and cutting the assembly formed by the non-elastic strip and the elastic tape fixed on said strip, transversely to the direction of travel so as to obtain a continuous series of articles separated from each other; the said non-elastic strip being further subjected at regular intervals to a second cutting operation following a predetermined outline so as to form rough shapes of the articles to be obtained.

13 Claims, 6 Drawing Figures

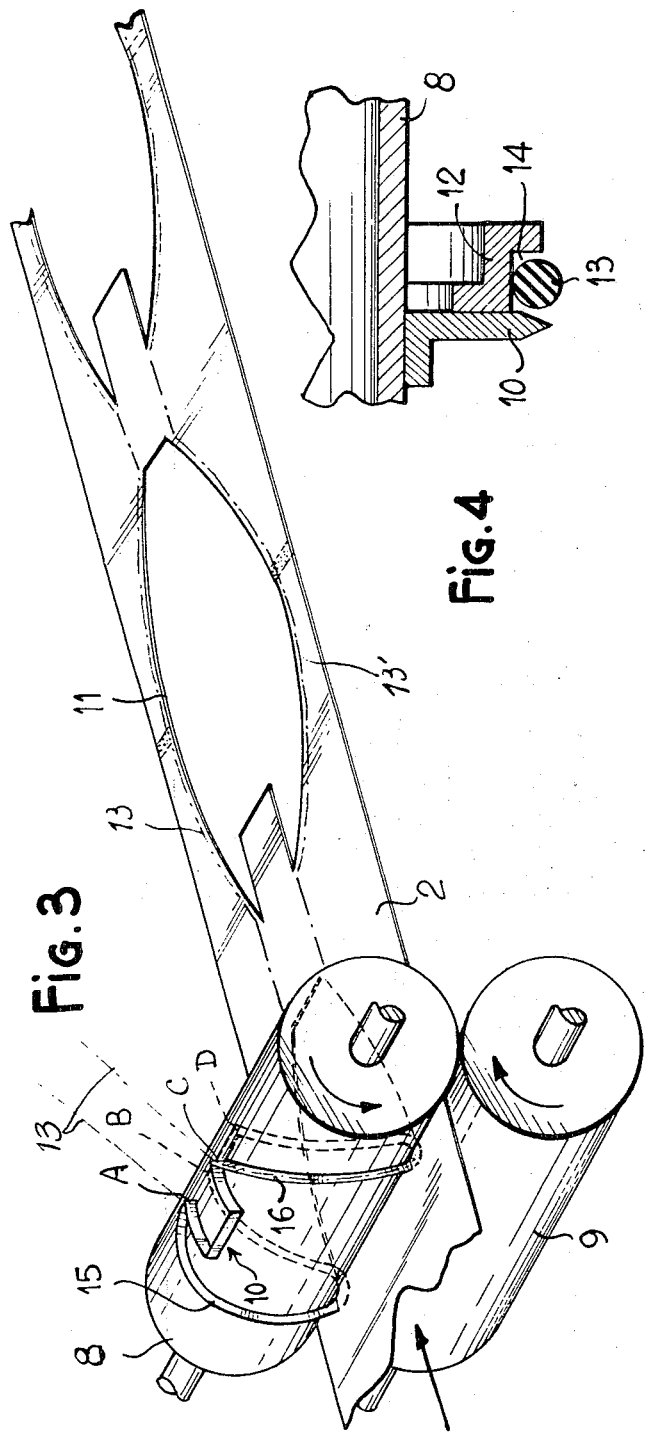

3,828,367

METHOD OF AND INSTALLATION FOR CONTINUOUS MANUFACTURE OF UNSEWN ARTICLES OF CLOTHING

BACKGROUND OF THE INVENTION

The present invention relates to a method of continuous manufacture of articles constituted by a non-elastic flexible element on which is fixed locally at least one elongated elastic element so as to give the non-elastic element the faculty of extension.

More particularly, but not in any limitative manner, the method according to the invention tends to improve the processes of manufacture of articles of fabric provided with an added elastic element, such as especially a band of natural or artificial rubber. The term "fabric" is understood to cover both woven, knitted or plaited products produced from natural, artificial of synthetic textile threads, and also those commonly known as "non-woven." Similarly, the term "band" represents both flat elastic strips and threads having any suitable kind of section.

The invention also relates to an installation for carrying the above method into effect and, by way of a new industrial product, to an article produced by this method.

The method according to the invention relates more specifically to the manufacture of articles in which the elastic element is fixed on the non-elastic element by an adhesive means, for example by glue.

BRIEF DESCRIPTION OF THE PRIOR ART

Methods are already known which concern the fixing of an elastic on a fabric. These methods are especially employed in the manufacture of disposable articles of clothing such as briefs or panty briefs having an elastic at the waist and at the opening for the legs.

These methods generally consist of cutting out from a strip of fabric separate rough shapes of the articles to be produced laying each individual rough shape flat on a support, and applying and fixing on the rough shape one or a plurality of lengths of previously stretched elastic tape.

It will be understood that by this means it is possible to eliminate any sewing operation on the article, which results in an appreciable economy of labour and enables the manufacturing cost of these articles to be reduced. The material of which the briefs are made is generally very cheap, especially in the case of non-woven material.

However, for the fixing of the elastic, these methods necessitate handling of the rough shapes one by one, which involves a considerable loss of time and more or less eliminates the advantage obtained by the new methods of cutting-out rough shapes continuously and at high speed.

The use of labour, even small, for this type of operation does not permit reduction of the production cost of these articles to the maximum possible extent, which is important because these articles are intended to be thrown away after use, and thus must be as cheap as possible.

The essential obstacle to complete automation of the method of manufacture of these articles resides in the fact that the elastic tape must be fixed in the stretched condition on the fabric travelling in the flat position.

BRIEF SUMMARY OF THE INVENTION

The present invention discloses a method which allows completely automatic manufacture of these products.

According to this method, a continuous strip of the non-elastic fabric is caused to travel without deformation, at a constant speed and always in the same direction, while; simultaneously there is moved in the direction of travel of the strip and at the same speed, at least one continuous tape of the elastic element while subjecting it to a pre-determined elongation the said elastic tape is fixed in the stretched state on the non-elastic strip and there is then effected a transverse cutting operation with respect to the direction of travel of the assembly constituted by the non-elastic strip and the elastic tape fixed thereto, in order to separate the articles from each other.

In the case where the articles to be produced must have a particular shape, as is the case for example with panty briefs, the non-elastic strip is subjected at intervals along its length to a cutting operation following a pre-determined pattern, this being intended to supply the rough shapes of the articles to be obtained. This cutting operation may take place before the transverse cutting, and in this case the rough shapes will remain connected to each other until the transverse cut is effected to separate the articles from each other, the elastics in the stretched condition being obviously fixed in the continuous portions of the strip.

The cutting-out operations for obtaining the rough shapes and fixing the stretched elastic tape may, if so desired, be effected simultaneously.

In addition, in the case where the articles to be manufactured are constituted, in the finished state, by two panels, symmetrical or not, folded one on the other, the strip of non-elastic fabric will be automatically folded back on itself along a line extending in the direction of travel, this operation taking place after the cutting-out operation and before the transverse cut.

In the case of manufacture of disposable briefs, the method according to the invention may be adapted in the following manner:

In the direction of the length of the non-elastic travelling strip, there is continuously produced a succession of rough shapes of briefs laid flat and attached to each other, by cutting-out from the central zone of the strip parts which form the profile of the leg openings of the briefs, the edges of the strip being intended to serve to form the belt of the briefs, while the transverse tongue of the strip separating two successive cut-out pieces is intended to form the gusset of the briefs;

and continuous elastic tapes are continuously fixed in the stretched state, on the one hand along each of the lateral edges of the non-elastic strip, and on the other hand along each of the parts of the leg-opening profile which are located on each side of the tongue of the strip forming the gusset.

There will now be described simply by way of non-limiting example, one form of embodiment of an installation enabling the method according to the invention to be carried into effect, reference being made to the accompanying drawings, in which:

FIG. 3 is a view in perspective to a larger scale showing more particularly the tool for cutting-out the rough shapes;

FIG. 4 is a section to a larger scale of the cutting tool associated with an elastic tape guide in the position of rest;

FIG. 5 is a section similar to that of FIG. 4, showing the cutting tool in action; and FIG. 6 is a detail to a larger scale of the transverse cutting-out device which separates the articles from the strip.

DETAILED DESCRIPTION OF THE INVENTION

Figure 1:
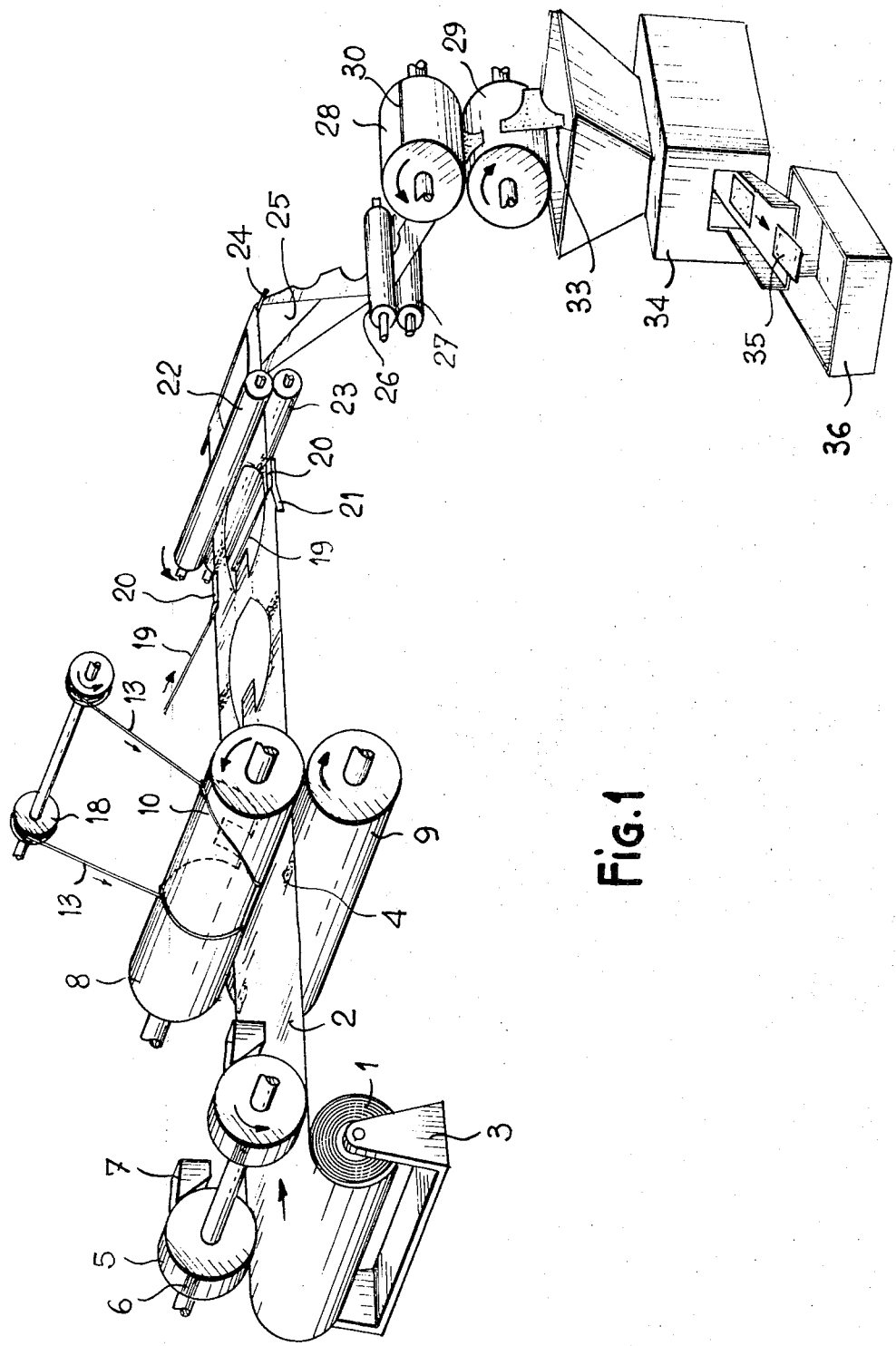
FIG. 1 is a diagram in perspective showing typical assembly for the continuous manufacture of disposable briefs.

In the drawings there has been shown at 1 a roller of a band 2 of non-woven material which is mounted so as to be capable of rotating on its axis in an unwinding support 3. The roller 1 may, if so required, be driven in rotation by a driving system (not shown).

Zones 4 located at intervals along the edges of the band 2 are covered with adhesive by a supply systen constituted, in the example shown, by two rollers 5 mounted on a common shaft and driven in rotation in the direction of the arrows. On the edge of each roller is provided a hollowed impression 6 (for example fluted, as shown) intended to receive a dose of adhesive product at every revolution of the roller (for example with an adhesive activated by heat) delivered by a supply device 7 of conventional type, constituted by a receptacle containing the adhesive product against which the roller rubs and a scraper cleaning the non-fluted portion of this roller.

The strip 2 treated locally with adhesive, then passes through two cylinders 8 and 9 intended to cut-out the rough shapes of the briefs and to place in position the elastics of the leg openings.

The cylinders 8 and 9 are driven in rotation in opposite directions at the same linear speed as the speed of travel of the strip 2.

The cylinder 9 or supporting cylinder is preferably coated with a layer of rubber which enables it to cooperate with the cylinder 8 or tool-carrier cylinder. In fact, on the outer surface of this latter is provided a sheath having a cutting-out blade 10, the profile of which developed on the flat corresponds to the cutting line 11 of the strip which can more particularly be seen from FIGS. 2 and 3.

The type of cut effected by the blade 10 will be described later.

As can be seen more especially from FIGS. 4 and 5, on the outer flank of the blade 10 is fixed (for example by welding) a form of guide 12 for an elastic 13, which forms with the blade 10 a U-shaped housing 14 having a depth less than the diameter of the elastic 13. The elastic 13 is preferably of a conventional thermo-adhesive type, constituted for example by an elastic core coated with a heat-activated adhesive product.

It will be noted that this form of guide is constituted by two elements which extend along the curved lateral portions 15 and 16 of the blade, between the points A and B for the portion of blade 15 and between the points C and D for the portion 16.

Each element of the form guide receives a thermo-adhesive elastic thread 13 delivered from a reel 18 mounted on a shaft and driven in rotation in the direction of the arrow. It will be noted that the reels 18 are driven at a speed less than that of the tool-carrier cylinder 8, so that between the cylinder 8 and the reel 18, the elastic is subjected to a pre-determined tension, housed in the guide form in the tensioned state and applied against the strip 2 (as shown in FIG. 5) still in the stretched condition.

The guide form 12 will advantageously be provided with a heating means, for example an electric resistance which will heat the adhesive film of the elastic thread 13, thus permitting its adhesion on the strip 2 during its application. As can be seen from FIG. 5, by virtue of the fact that the diameter of the thread 13 in the stretched condition is greater than the depth of the housing 14 in the guide, the thread will be compressed during its application between the guide and the strip, which will facilitate its adhesion.

After this operation, additional elastic thread, which may also be thermo-adhesive, is placed in position at the point which will form the belt of the knickers. To this end, two continuous elastic tapes 19, previously stretched, are brought into contact with the lateral edges of the strip 2. These tapes 19 may be of the same kind as the threads 13 and may also be unwound from reels driven, like the reels 18 at a speed lower than the speed of travel of the strip 2. It will however be understood that any other system could be adopted which ensured a prior tensioning of the elastic tapes 19.

These tapes 19 are introduced into lateral guides 20 having a U-shaped cross section in which the edges of the fabric 2 move, and which ensure the application of the elastic tapes against these latter. It will be noted that the guides 20 also make it possible to effect a folding back of the edges of the strip on the elastic threads. For this purpose, they have a vertical portion 21 in the form of a ramp which pushes back and folds the projecting portion of the strip towards its interior and over the elastics.

The elastic belt tapes are then fixed on the strip by the passage of this latter between two pressure rollers 22 and 23 provided with a heating device intended to activate the adhesive product coated on the elastic tapes and thus to render it adhesive.

In a subsequent phase, the strip 2 is folded back on itself by a system of continuous folding along a line extending in the direction of travel of the strip.

This system of folding is conventional and has been simply shown diagrammatically in FIG. 1 by a return transverse rod 24 over which the strip passes, and by a vertically arranged folding blade 25.

At the outlet of the folding system, the strip folded back on itself passes between two pressure rollers 26–27 provided with heating means and carrying out the sticking of the zones 4 of the strip which have been previously coated with adhesive.

The folded and adhesively fastened strip is then introduced into a mechanism for cutting out the finished articles and pinching the extremity of the strip.

In the example shown, this mechanism is constituted by two cylinders 28–29 driven in rotation in opposite directions by a driving system (not shown) and in synchronism with the roller 1 of non-woven material.

The periphery of these cylinders is preferably coated with a layer of rubber. At least one of the cylinders, for example the cylinder 28, carries a cutting blade 30 extending along a generator line and ensuring the separation of the articles by cutting into the adhesive coated zones 4. The cylinder 29 may comprise a supporting surface 30' for the blade 30.

The drive of the strip 2 and the maintenance of the stretched condition of the elastic threads fixed to the strip are obtained very simply by the provision over a zone of each cylinder 28 and 29 of a flexible boss 31–32 respectively (see FIG. 6). These bosses are located immediately upstream of the blade 30 and of the supporting surface 30' in order that, as has been shown in FIG. 6, the separation of the articles 33 from the strip 2 only takes place after the extremity of the strip located upstream of the blade 30 has been pinched by the bosses 31–32.

The completed articles 33 are then ejected to an automatic wrapping machine 34 in which they are wrapped in a sachet 35. They are recovered at the outlet of the machine in a reception tank 36.

Figure 2:
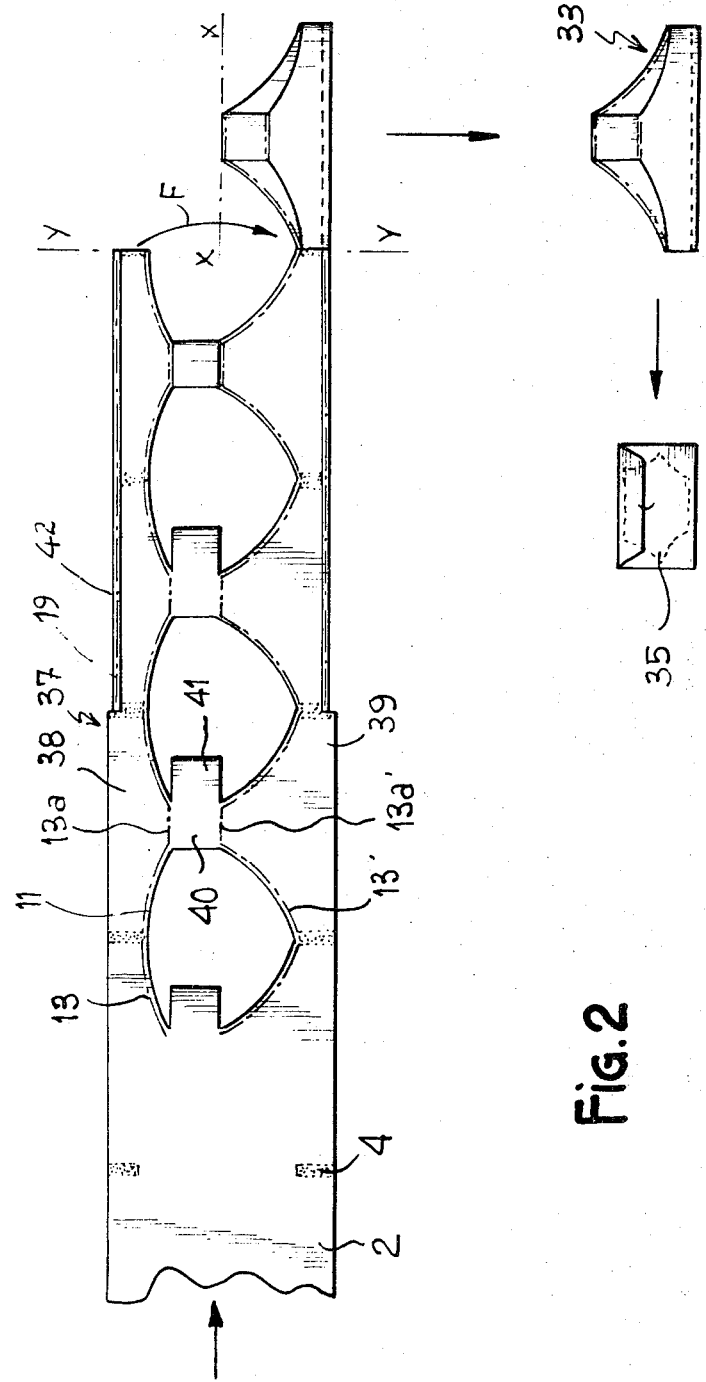
FIG. 2 is a schematic view representing the various operations to which the strip of fabric is subjected by the assembly shown in FIG. 1.

In order to complete this description, there will now be explained with reference to FIG. 2 the various phases of treatment of the strip from the origin up to the production of articles which are more precisely disposable briefs.

After applying the adhesive in the zones 4, the strip is cut-out along the profiles 11 which determine the rough shapes 37 laid flat and delimited by two successive lines of adhesive. These rough shapes 37 are connected to each other by the portions of strips carrying the adhesive zones 4 and they show at 38 the front panel and at 39 the rear panel of the briefs, these panels being joined together by a tongue 40 intended to form the gusset. It will be noted that during cutting-out, the tongue 40 will remain fixed on one side of a turned back gusset 41 intended to be folded back against the portion 40.

As had already been stated, at the same time as the cutting is effected, the elastics 13 and 13' are fixed along each of the upper and lower edges of the cut. It will be noted that the elastics 13 and 13' being continuous, they are also fixed at 13a and 13a' transversely to the portion 40 which is to form the gusset.

The elastic tapes 19 of the belt are fixed to the edges of the strip 2 and covered by the folded-over portion 42. The gusset fold 41 is folded back over the part 40 and then the strip portion forming the front panel of the briefs is folded back along the arrow F following the folding line x—x close to the longitudinal axis of the strip. The folding results in the sticking together of the zones 4. Following this, the article thus completed is separated from the remainder of the strip by cutting along the transverse line y—y located in the centre of the adhesive zones 4.

The present description is of course not in any way limitative and the manufacture of articles other than briefs could be effected by the method according to the invention. Similarly, certain phases of the process of manufacture could be interchanged without thereby departing from the scope of the invention. Furthermore, it will be understood that instead of utilizing thermo-adhesive elastic threads, ordinary threads could be employed on which a layer of adhesive would be deposited just before their application to the fabric.

Finally, the elastic tapes may be fixed to the fabric along their whole length, but this adhesion will preferably be made at spaced points, the elastic tapes being then only made adhesive at intervals or alternatively they are subjected to a discontinuous application pressure against the fabric.

What we claim is:

1. A method of continuous manufacture of articles of clothing including a flexible non-elastic fabric on which is fixed at least one elastic element so as to confer on said non-elastic fabric the faculty of stretching, said method comprising the steps of:

causing a continuous strip of said non-elastic fabric to travel without deformation at a constant speed along a linear path;

simultaneously causing at least one continuous tape of said elastic element to move in the same direction of travel as said strip and at the same speed, while subjecting said elastic tape to a predetermined stretch;

fixing said stretched elastic tape on said non-elastic strip; causing the simultaneous motion of said non-elastic strip and said stretched elastic tape by means of a common gripping means, said common gripping means maintaining the elastic tape fixed on said non-elastic strip in the stretched condition until the assembly formed by said non-elastic strip and the stretched elastic tape is cut;

cutting the assembly transversely to its direction of travel immediately adjacent said gripping means to produce panels of said assembly separated from each other; and forming said assembly panels into clothing articles.

2. The method of claim 1 including the step of cutting said non-elastic fabric at intervals along a predetermined outline to form rough shapes of the clothing articles to be manufactured prior to the cutting of said assembly transverse its direction of travel.

3. The method of claim 1 wherein the steps of gripping said assembly and cutting said assembly transversely to its direction of travel are accomplished simultaneously by said gripping means.

4. The method of claim 2 wherein the steps of cutting said non-elastic fabric along a predetermined outline and the step of fixing said stretched elastic tape on said non-elastic fabric strip are effected simultaneously.

5. The method of claim 3 including the step of folding said cut out panel assembly back upon itself along the line extending in the direction of linear travel of said non-elastic element prior to performing the step of cutting said non-elastic strip transversely to the direction of travel.

6. The method of claim 5 including the step of coating the areas of said non-elastic fabric where the transverse cuts are subsequently to be made with an adhesive material prior to folding said non-elastic fabric back upon itself to permit the completed article of clothing to be joined together along its lateral edges.

7. A method of continuous manufacture of panty briefs having an elastic waist and elastic leg openings comprising the steps of:

causing a continuous strip of non-elastic fabric to travel without deformation at a constant speed along a linear path;

cutting pieces from the central portion of said non-elastic fabric strip at regular intervals therealong to form the outlines of the leg openings of said panty briefs, the lateral edges of said fabric strip being intended to serve as the belt of said panty briefs while the transverse non-elastic fabric tongue separating two successive cut out portions is intended to form the gusset of said panty briefs;

causing at least one continuous elastic tape to move in the same direction of travel as said non-elastic fabric strip and at the same speed, while subjecting said elastic tape to a predetermined stretch;

fixing said at least one continuous elastic tape in the stretched condition along each of the lateral edges and along each of the leg opening outlines of said non-elastic strip; common gripping means causing the motion of said non-elastic strip and said stretched elastic tape, and said common gripping means maintaining the elastic tape fixed on said non-elastic strip in the stretched condition until the assembly formed by said non-elastic strip and the stretched elastic tape is cut;

cutting said assembly transverse the direction of movement of said assembly at intervals therealong; and forming the cut portions of said assembly into panty briefs.

8. The method of claim 7 wherein the step of forming said cut assemblies into panty briefs includes the steps of folding said cut assemblies upon themselves and adhesively fastening the lateral edges of said non-elastic strip together at spaced points to form a waistband.

9. The method of claim 7 wherein the steps of cutting pieces from the central portion of said non-elastic fabric strip at regular intervals therealong to form the outlines of leg openings and the step of fixing said continuous elastic tape in the stretched condition along each of the leg opening outlines are effected simultaneously.

10. The method of claim 7 including the step of coating the areas of said non-elastic fabric where the transverse cuts are subsequently to be made with an adhesive material prior to cutting said assembly at intervals transverse its direction of movement.

11. A method of continuous manufacture of panty briefs having an elastic waist and elastic leg openings comprising the steps of:

causing a continuous strip of non-elastic fabric to travel without deformation at a constant speed along a linear path;

causing at least one continuous elastic tape to move in the same direction of travel as said non-elastic fabric strip and at the same speed;

cutting pieces from the central portion of said non-elastic fabric strip at regular intervals therealong to form the outlines of the leg openings of said panty briefs while simultaneously fixing said continuous elastic tape in the stretched condition along each of said leg opening outlines;

fixing said continuous elastic tape in the stretched condition along each of the lateral edges of said non-elastic fabric strip;

cutting said stretched continuous elastic tapes and said continuous strip of non-elastic fabric transverse the direction of movement of said fabric at intervals therealong; and forming the cut portions of said assembly into panty briefs.

12. The method of claim 11 including the step of folding said cut out panel assembly back upon itself along the line extending in the direction of linear travel of said continuous strip of non-elastic fabric prior to performing the step of cutting said stretched continuous elastic tapes and said continuous strip of non-elastic fabric transverse their direction of movement.

13. The method of claim 12 including the step of coating the areas of said non-elastic fabric where the transverse cuts are subsequently to be made with an adhesive material prior to folding said non-elastic fabric back upon itself to permit the completed article of clothing to be joined together along its lateral edges.

* * * * *